United States Patent [19]

Carver

[11] 4,024,666
[45] May 24, 1977

[54] VARIABLE STIFFNESS FISHING ROD

[76] Inventor: Stephen Dee Carver, Rte. 5, Box 561, Little Rock, Ark. 72212

[22] Filed: Feb. 17, 1976

[21] Appl. No.: 658,467

[52] U.S. Cl. .............................................. 43/18 R
[51] Int. Cl.² ...................................... A01K 87/00
[58] Field of Search ................. 43/18 R, 18 FG, 23

[56] References Cited

UNITED STATES PATENTS

| | | | |
|---|---|---|---|
| 279,988 | 6/1883 | Smith | 43/18 R |
| 2,351,734 | 6/1944 | Backe | 43/18 R |
| 2,478,131 | 8/1949 | Rossi | 43/18 R |
| 2,816,389 | 12/1957 | Sens | 43/18 R |
| 2,902,789 | 9/1959 | Mehr | 43/18 R |
| 3,570,164 | 3/1971 | Tozier | 43/18 R |

Primary Examiner—Warner H. Camp

[57] ABSTRACT

A fishing rod which can be selectively varied in strength or tension by the fisherman. In the preferred embodiment the apparatus comprises an elongated, tubular rod portion, a plurality of spaced apart, internally disposed force transmitters, a plurality of cooperating, spaced apart force distributing receivers, and a cable tensioning means coaxially disposed interiorly of the rod portion for selectively moving the force transmitters into compressive engagement with the receivers. In one form the rod includes a twistable handle portion which is adapted to selectively tension the cable means thereby stiffening the rod as desired by the fisherman.

8 Claims, 6 Drawing Figures

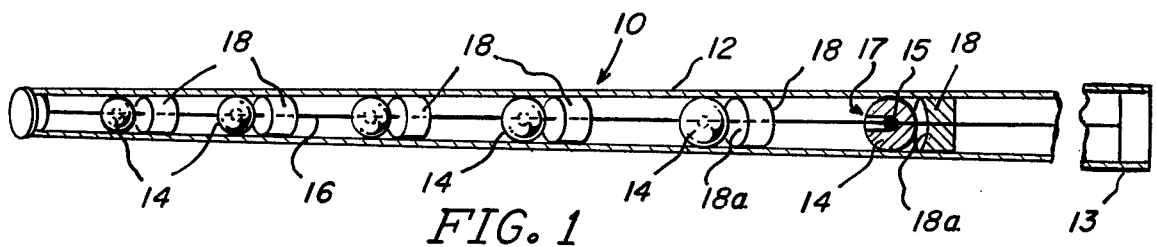
FIG. 1
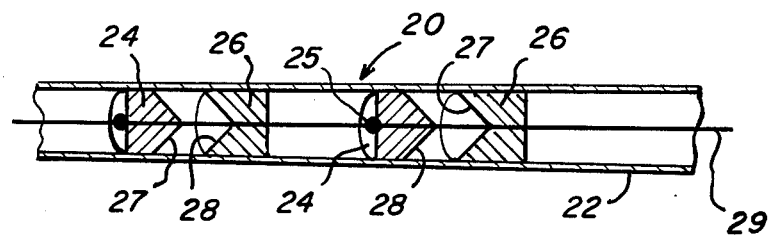
FIG. 2
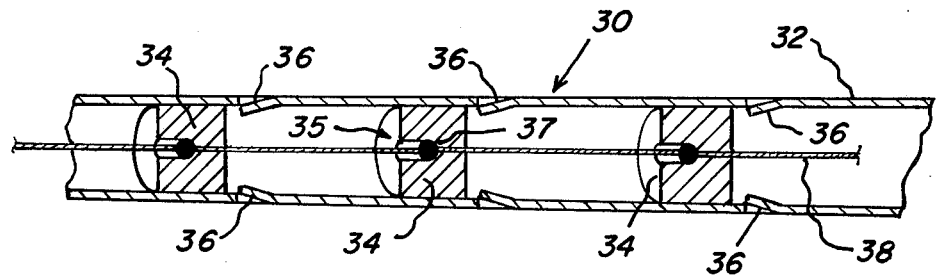
FIG. 3
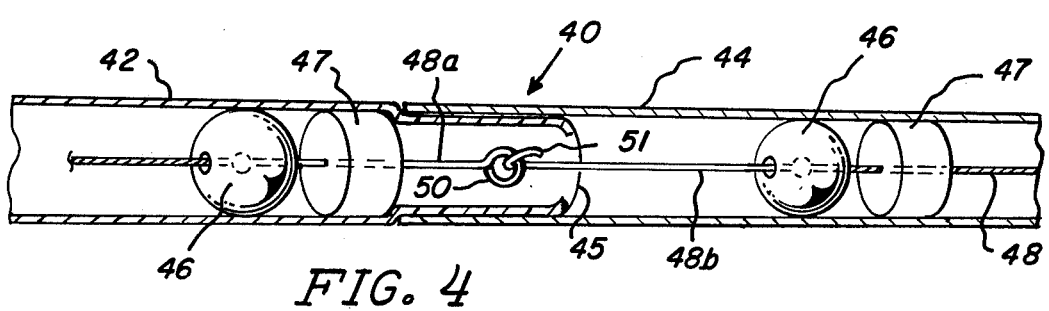
FIG. 4
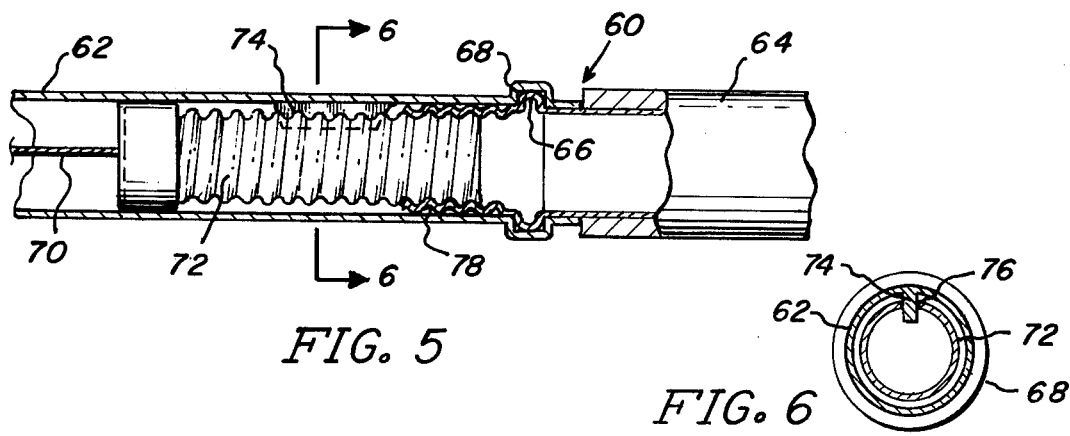
FIG. 5
FIG. 6

VARIABLE STIFFNESS FISHING ROD

BACKGROUND OF THE INVENTION

This invention relates generally to fishing rods. More particularly, this invention relates to a fishing rod which may be selectively varied in stiffness as desired by the fisherman to accommodate a variety of fishing conditions.

Conventional fishing rods are available in a variety of fixed strengths. Extremely flexible fishing rods are commonly denoted as "light action" rods, while stiffer or heavier rods range from "medium action" to "heavy action" rods. As will be recognized by those skilled in the art, a light action rod is often desirable for casting light lures relatively long distances. A light action rod is often advantageous when smaller fish such as croppie, sunfish or trout are being sought by the fisherman. A light action rod is also advantageous for proper presentation of light lures such as small jigs, poppers or the like. On the other hand a heavy action rod is advantageous when fishing with large or heavy lures such as tandom spins, weighted plastic worms, or heavier top water lures in the ⅝'s to ⅞'s ounce class. It is thus advantageous to employ a medium action or heavy action rod when fishing for large mouth bass or northern pike. Since a heavy action rod will be more difficult to cast, some fisherman compromise and employ a "medium action" rod under most circumstances. However, when a light action or medium action rod is employed, it may result in anxious moments when the fisherman hooks into the once in a lifetime trophy fish in the 20 to 30 pound category. Because of his fear of loosing a large fish, some fishermen will employ a heavy action rod at all times. However, as mentioned, a heavier action rod will be more difficult and tedious to cast.

The problem of rod strength is well known in the fly fishing art. When fly fishing for trout, for example, a fisherman may employ a relatively light action fly rod, the "strength" of which may be denoted as a "number 5." The extreme flexibility of such a rod allows the fly fisherman to reach out long distances and to adequately handle relatively small trout. Skillful anglers often employ a relatively stiff fly rod in the pursuit of largemouth bass or northern pike. An effective technique is to present a popper or a large fly at the edge of a weed bed known to be inhabited by bass. Bass fishermen, for example, may employ a relatively stiff number 8 or 9 rod when fishing in this fashion. While a stiff fly rod is generally more difficult to handle than a lighter action fly rod, when a large bass is hooked it will be easier to land with a heavier rod.

For these and other reasons it is thus desirable to employ a fishing rod which can be varied by the fisherman between relatively light action and relatively heavy action strengths. It would appear that no known fishing rod accomplishes these objectives in a practical manner. One prior art fishing rod which can be varied in strength is disclosed by Backe in the U.S. Pat. No. 2,351,734 issued June 20, 1944. The latter rod comprises a plurality of individual sections which are externally coupled together by means of springs. Collapsible or flexible structural members are disclosed in U.S. Pat. No. 2,822,896 issued to W. Schuster, on Feb. 11, 1958; U.S. Pat. No. 3,349,526, issued to Schuster on May 20, 1965; U.S. Pat. No. 2,524,748 issued to Baker on Oct. 10, 1950; and U.S. Pat. No. 3,886,700 issued to Lambert on June 3, 1975. A foldable antenna is disclosed in U.S. Pat. No. 2,379,577 issued to H. Harsted, on July 3, 1945. All of the known relevant prior art devices comprise a plurality of individual external segments which are adapted to be selectively coupled together.

SUMMARY OF THE INVENTION

In the preferred embodiment the fishing rod disclosed herein comprises a single elongated tubular rod portion which includes a plurality of internally disposed, spaced apart force distributing transmitters which cooperate with a plurality of internally disposed, stationary force distributing receivers to effect a net tensioning or stiffening of the fishing rod. An internal coaxially disposed cable is preferably employed to urge each of the force transmitters into abutment with corresponding adjacent receivers in response to manipulation by the fisherman. A twistable force tensioning means preferably located in the handle of the fishing rod may be selectively manipulated by the fisherman to effect tensioning of the rod in the desired amount. Thus, when the tubular rod portion is of relatively light action construction, tensioning of the internal elements results in a fishing rod of somewhat stiffer characteristics. Therefore the fisherman may enjoy the benefits of a relatively easily castable light or medium action rod, while being able to tension the rod where desired to land a relatively heavy fish.

Thus, a fundamental object of this invention is to provide a fishing rod of variable stiffness characteristics.

Moreover it is an object of this invention to provide a fishing rod which may be varied in tension as desired by the fisherman.

Another object of this invention is to provide a single element fishing rod of rugged and durable characteristics which can be increased in stiffness when so desired.

A still further object of this invention is to provide a fishing rod of the character described which includes a twistable handle portion adapted to be manipulated by the fisherman for effectuating the variable stiffness characteristics.

A still further object of the invention is to provide apparatus for variably stiffening a fishing rod which can be employed, if necessary, in a fly rod. A significant feature of this invention is that the tension inducing means are disposed entirely interiorly of the rod itself.

Yet another object of this invention is to provide apparatus for variably stiffening the fishing rod which can be employed, if necessary, in relatively long rods which must necessarily comprise two or more individual sections.

These and other objects and advantages of this invention, along with features of novelty appurtenant thereto, will appear or become apparent in the course of the following description.

BRIEF DESCRIPTION OF THE DRAWINGS

In the following drawings, which form a part of the specification and are to be construed in conjunction therewith, and in which like reference numerals have been employed to indicate like parts in the various views;

FIG. 1 is a cross-sectional view showing a fishing rod constructed in accordance with the teachings of this invention;

FIG. 2 is a cross-sectional view of an alternative embodiment;

FIG. 3 is a cross-sectional view of another alternative embodiment;

FIG. 4 is a cross-sectional view illustrating the coupling together of individual sections of a rod, in which the variable tension means have been employed;

FIG. 5 is a cross-sectional view of a handle portion which may be employed to effectuate tensioning of the force transmitters disclosed in the prior figures; and FIG. 6 is a cross-sectional view taken along line 6—6 of FIG. 5.

DETAILED DESCRIPTION OF THE DRAWINGS

Referring now to FIG. 1, the fishing rod 10 constructed in accordance with the teachings of this invention is thereshown. Rod 10 preferably comprises an elongated, tubular rod portion 12 which may be of conventional fiber glass construction. Disposed internally within rod 12 are a plurality of spaced apart force distributing transmitters 14 which are preferably linked together by an elongated connecting cable 16 preferably disposed coaxially within rod 12. Cable 16 is attached or anchored internally to each of the movable transmitters 14 via a knot 15 (or other suitable attachment) which may be received with a recess 17. A plurality of stationary, spaced apart force distributing receivers 18 are also disposed internally of rod 12. A passageway provided in each of the receivers 18 allows cable 16 to freely pass coaxially therethrough.

Each of the force distributor transmitters 14 is located in close proximity to an adjacent force distributing receiver 18. Distributors 14 are moveable within the rod 12 while receivers 18 are stationary, being fastened within rod 12 through gluing or other conventional techniques. When a net tensioning of cable 16 is effectuated, each of the force transmitters 14 will be forced into abutment with corresponding adjacent receivers 18, thereby effectuating a net increase in tension throughout the length of rod 12. This factor combined with the tension experienced by cable 16 results in effective strengthening or increased tensioning of the rod 12 so that the previously discussed benefits can be achieved.

In FIG. 1 each of the force distributors 14 are preferably of spherical shape, and may be comprised of plastic, metal or the like. Each of the force receivers 18 thereshown are preferably in the form of truncated cones, each having a concave surface portion 18A for convenient, mating abutment with its adjacent force distributor 14.

It will be apparent that since rod portion 12 is preferably of conventional tapered construction, each of the receivers and transmitters disposed therewithin will preferably take on a gradually increasing diameter depending upon its closeness relative to rod end 13.

An alternative embodiment 20 (FIG. 2) comprising a similar, conventional tubular elongated rod portion 22 comprises force distributors 24 of generally conical appearance and stationary force receivers 26 which have a conical recessed portion 27 thereof adapted to matingly engage the leading edge portion 28 of transmitters 24. Force receivers 26 may be fastened within rod 22 by glue or the like. An elongated, preferably metallic cable 29 extending through each of the receivers 26 is fastened to the transmitters 24 by attachment 25 to effect tensioning of rod 22 in a manner to be described in more detail later.

An alternative embodiment 30 (FIG. 3) comprises a conventional, tubular elongated rod portion 32 having a plurality of spaced apart force distributing transmitters 34 disposed therewithin. Each of the transmitters 34 takes the form of a truncated cone, and of course the diameter of the distributors 34 increases as the diameter of rod 32 increases. The force distributing receivers 36 comprise rings or notches which may be formed along the internal surface of the rod 32. A cable 38 effects net tensioning of rod 32 by moving each transmitter 34 into abutment with a corresponding adjacently located force receiver 36. Cable 38 is attached to each transmitter 34 by a knot 37 received within recessed orifice 35.

Referring now to FIG. 4, a fishing rod 40 thereshown includes a section 42 which is attached to section 44 via a conventional ferrule 45 in the usual manner. Each section of the rod comprises internally disposed force transmitters 46 and stationary force receivers 47. A cable 48 which coaxially extends through rod 40 is anchored within each of the force transmitters 46 and provides tensioning of the rod in the previously discussed manner. However, since rod 40 is of multi-segmented construction, the cable 48 may be connected together via a conventional ring 50 and a cooperating hook 51. Thus, when a multi-section rod is needed, cable section 48A is joined together with cable 48B in any conventional manner.

In order to selectively induce tension within cables 16, 29, 38, or 48, the apparatus shown in FIGS. 5 and 6 may be employed. Thereshown is a handle section 60 which adjoins one end of a conventional, tubular elongated fishing rod portion 62. Handle section 60 includes a rotateable hand grip member 64 which is coupled to rod 62 by a circumferential lip portion 66 thereof which is matingly received within an internal groove 68 in rod section 62. Lip 66 and groove 68 cooperate to prevent relative axial displacement between rod portion 62 and handle portion 64 while facilitating relative rotation.

Cable 70 is received within a generally cylindrical, threaded member 72, rotation of which is prevented by a notched portion 74 thereof received within an internal groove or channel 76 at the upper portion of rod 62 (FIG. 6). Handle portion 64 includes a tubular, generally cylindrical internally threaded segment 78 which threadably receives member 72. As handle portion 64 is rotated, it will be observed that cylindrical segment 72 may be drawn into segment 78 thereby effectuating a net tensioning of cable 70, thereby forcing each transmitter into abutment with its adjacent receiver. Therefore, when it is desired to effectuate tensioning of the rod the fisherman need merely rotate handle portion 64 as desired. While the handle apparatus shown in FIGS. 5 and 6 may be employed with the invention, the structure thereshown is not mandatory, and any structure capable of inducing selective tension within a cable may of course be employed.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without department from the scope thereof, it is to be understood that all matter herein set forth or shown in the accompanying drawings is to be interpreted as illustrative and not in a limiting sense.

Having thus described my invention I claim:

1. A variable stiffness fishing rod comprising:
   an elongate, tubular rod portion of predetermined length;
   a handle portion communicating with said tubular rod portion;
   a plurality of stationary, force receivers disposed interiorly of said rod portion at spaced apart locations therein for selectively distributing force along the length of said rod portion to tension same;
   a plurality of spaced apart, moveable force transmitters disposed interiorly of said rod portion, each one of said force transmitters positioned adjacent a corresponding one of said receivers; and
   tension means disposed interiorly of said rod portion for moving said transmitters into abutment with said receivers thereby effecting stiffening of said fishing rod, said tension means comprising elongated cable means disposed concentrically within said rod portion and passing through said receivers and said transmitters, said cable means being attached to each one of said transmitters to prevent axial displacement therebetween.

2. The combination as defined in claim 1 wherein said fishing rod comprises:
   means for controllably tensioning said cable means thereby forcing said transmitters into abutment with said receivers to stiffen said rod, said last mentioned means operable in response to manipulation of said handle portion.

3. The combination as defined in claim 2 wherein said controllable cable tensioning means comprises:
   a threaded sleeve member attached to said cable means; and
   a rotatable handle portion adapted to selectively matingly engage said sleeve member, thereby selectively varying tension by moving said sleeve member axially with respect to said rod.

4. The combination as defined in claim 3 wherein said rod portion includes a forward tip portion and said cable means is attached interiorly of said rod to said forward tip portion.

5. The combination as defined in claim 2 wherein said fishing rod comprises:
   a first tubular elongated portion;
   a second tubular elongated portion adapted to receive said first elongated portion thereby forming said fishing rod;
   said cable means comprising a first segment disposed interiorly of said first rod portion and a second segment disposed interiorly of said second rod portion and means for connecting said first cable section to said second cable section.

6. The combination as defined in claim 1 wherein said force transmitters comprise spheroids and said receivers comprise concave surfaces adapted to be contacted by said transmitters.

7. The combination as defined in claim 1 wherein said transmitters comprise tapered cone portions and said receivers comprise tapered recessed portions adapted to receive said transmitter cone portions.

8. The combination as defined in claim 1 wherein said receivers comprise rigid shoulder portions integrally formed interiorly of said rod.

* * * * *